United States Patent
Shi et al.

(10) Patent No.: US 8,787,039 B2
(45) Date of Patent: Jul. 22, 2014

(54) HYBRID ADAPTIVE POWER FACTOR CORRECTION SCHEMES FOR SWITCHING POWER CONVERTERS

(75) Inventors: Fuqiang Shi, Oak Park, IL (US); Xiaolin Gao, Santa Clara, CA (US); Hien Huu Bui, San Jose, CA (US); Yong Li, San Jose, CA (US); John William Kesterson, Seaside, CA (US)

(73) Assignee: Dialog Semiconductor Inc., Campbell, CA (US)

(*) Notice: Subject to any disclaimer, the term of this patent is extended or adjusted under 35 U.S.C. 154(b) by 187 days.

(21) Appl. No.: 13/552,567

(22) Filed: Jul. 18, 2012

(65) Prior Publication Data

US 2014/0022829 A1    Jan. 23, 2014

(51) Int. Cl.
H02M 3/335    (2006.01)

(52) U.S. Cl.
USPC .......................................................... 363/16

(58) Field of Classification Search
CPC . H02M 1/42; H02M 1/4258; H02M 3/33507; Y02B 20/347; Y02B 70/126
USPC ......... 363/15–19, 21.01, 21.02, 21.04, 21.05, 363/21.06, 21.07, 21.08, 21.09, 21.1, 21.11, 363/21.12, 21.13, 21.14, 21.15, 21.16, 363/21.17, 21.18, 97
See application file for complete search history.

(56) References Cited

U.S. PATENT DOCUMENTS

| | | | | |
|---|---|---|---|---|
| 5,134,355 | A * | 7/1992 | Hastings | 323/211 |
| 6,944,034 | B1 * | 9/2005 | Shteynberg et al. | 363/21.13 |
| 7,378,805 | B2 * | 5/2008 | Oh et al. | 315/291 |
| 2004/0136208 | A1 * | 7/2004 | Agarwal et al. | 363/21.12 |
| 2005/0099828 | A1 * | 5/2005 | Cheng et al. | 363/21.16 |

FOREIGN PATENT DOCUMENTS

WO    WO2009156891    * 12/2009

OTHER PUBLICATIONS

Semiconductor Components Industries, LLC, "Power Factor Corrected Buck LED Driver," Publication Order No. NCL30002/D, Mar. 2012, seventeen pages.
European Patent Office, Search Report and Opinion, European Patent Application No. 13171072.5, Dec. 6, 2013, seven pages.

* cited by examiner

*Primary Examiner* — Adolf Berhane
*Assistant Examiner* — Kyle J Moody
(74) *Attorney, Agent, or Firm* — Fenwick & West LLP (57) ABSTRACT

A method of a controller of a switching power converter that provides a configurable power factor control method for the switching power converter. The controller combines power regulation control methods of constant on-time control and constant power control to adjust the power factor of the switching power converter. The controller switches between constant on-time control and constant power control based on an input voltage of the power converter.

16 Claims, 7 Drawing Sheets

HYBRID ADAPTIVE POWER FACTOR CORRECTION SCHEMES FOR SWITCHING POWER CONVERTERS

BACKGROUND

1. Field of Technology

The embodiments disclosed herein relate to switching power converters with power factor correction.

2. Description of the Related Arts

Power factor in switching power converters is defined as the ratio of the real power delivered to the load to the apparent power provided by the power source. Utility companies or government agencies require power factors in switching power converters to exceed a certain minimum level by regulation. Thus, switching power converters should deliver power from the power source to the load with a high power factor and low harmonic distortion.

Current single-phase active power factor control techniques are generally divided into two categories: a two-stage approach and a single-stage approach. In the two-stage approach, a power factor control front-end stage converts alternating current (AC) input voltage into a direct current (DC) voltage on a bulk energy storage capacitor. A DC/DC converter such as a flyback switching power converter is used as the second output stage to provide isolated and regulated low output voltage or high output current to a load. In contrast, the single-stage approach combines the power factor control stage with the DC/DC stage into a single stage. In the single-stage approach, a single switch is controlled to achieve the dual function of input power factor correction and output voltage/current regulation.

Generally, two-stage power factor control circuits utilize a separate stage to shape the input current to be near sinusoidal and in phase with the input line voltage to achieve high input power factor and low total harmonic distortion (THD). However, the efficiency of the two-stage power factor control circuits are generally lower than the single-stage power factor control circuits because energy is processed twice in the two stages of the two-stage power factor control circuits. Furthermore, because of the use of two stages, two-stage power factor control circuits are more complex and costly compared to single-stage power factor control circuits. Thus, single-stage power factor control circuits are usually preferred for low-power applications due to cost and efficiency considerations.

SUMMARY

The embodiments disclosed herein provide a configurable power factor control method for a switching power converter. In one embodiment, the controller of the switching power converter combines power regulation control methods of constant on-time control and constant power control to adjust the power factor of the switching power converter. By combining the regulation modes, the controller balances the tradeoffs between each regulation mode to meet power factor requirements for low power applications and for output ripple performance.

In one embodiment, during each AC cycle of the input voltage to the power converter (i.e., a single AC cycle) the controller determines whether to operate the power converter in the constant power mode or the constant on-time mode based on the magnitude of the instantaneous input line voltage. Particularly, the controller operates the power converter in the constant on-time mode during the AC cycle of the input voltage if the instantaneous input line voltage is lower than a threshold voltage and switches the mode of operation to the constant power mode if the instantaneous line voltage is above the threshold voltage during the AC cycle of the input voltage.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments disclosed herein can be readily understood by considering the following detailed description in conjunction with the accompanying drawings.

Figure (FIG.) 1 illustrates a switching power converter that uses a combination of constant turn-on control and constant power control according to one embodiment.

DETAILED DESCRIPTION OF EMBODIMENTS

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

The embodiments disclosed herein describe a method of a controller of an AC/DC flyback switching power converter that provides a configurable power factor control for the switching power converter. In one embodiment, the controller combines the power regulation control methods of constant on-time control and constant power control (i.e., constant voltage mode and/or constant current mode control) to adjust the power factor of the switching power converter. Particularly, the controller adjusts the power factor based on the percentage of time within each AC cycle of the input voltage that the switching power converter is operated in the constant on-time control mode. By combining the regulation modes, the controller balances tradeoffs of the constant on-time mode and the constant power mode to meet power factor requirements for low power applications and for output ripple performance.

Figure 1:
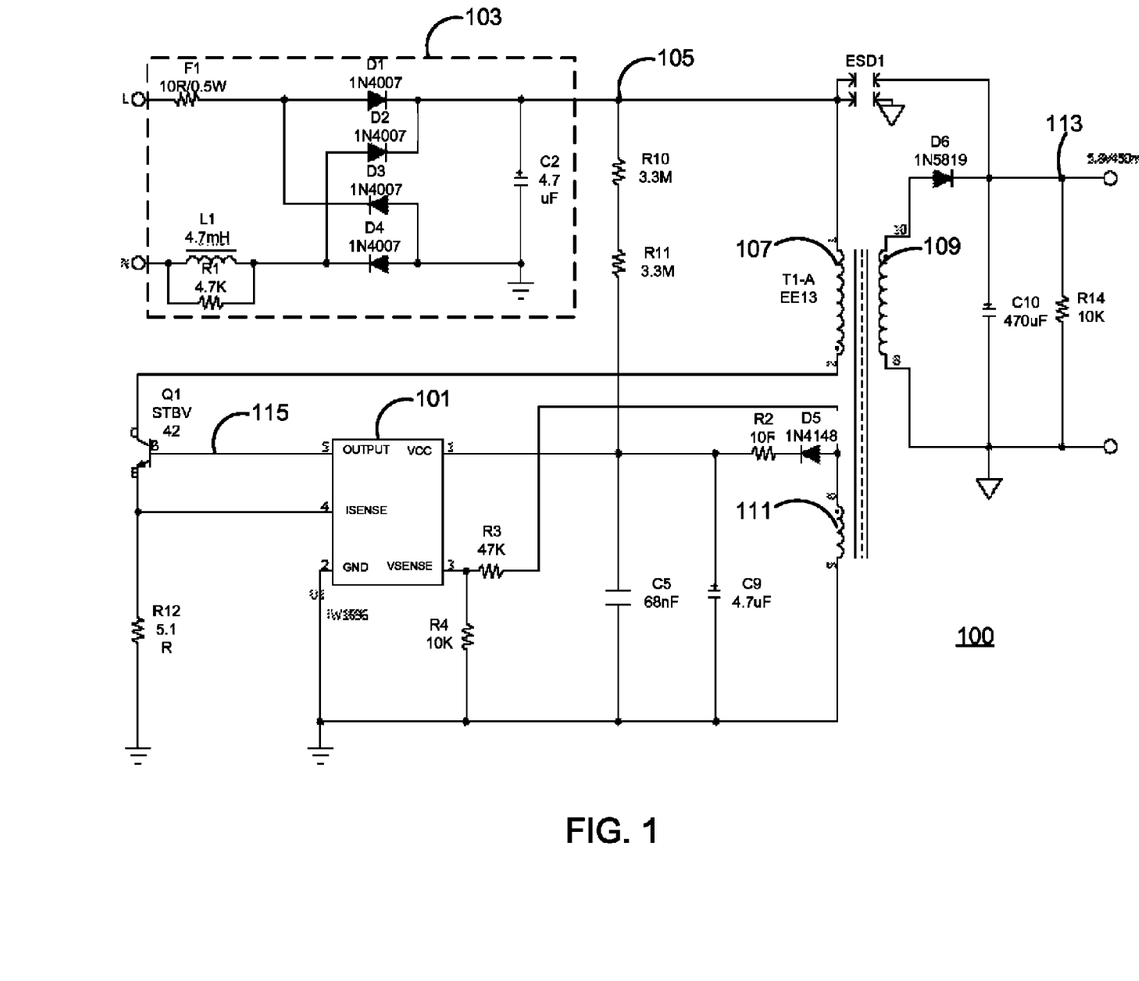

FIG. 1 illustrates an AC to DC flyback switching power converter, according to one embodiment. The power converter 100 includes three principal sections, i.e., a front end, a power stage, and a secondary stage. The front end 103 is connected to an AC voltage source (not shown) at nodes L, N, and includes a bridge rectifier comprised of inductor L1, resistor R1, resistor F1, diode D1, diode D2, diode D3, diode D4, and bulk capacitor C2. The rectified input line voltage at node 105 is input to the supply voltage pin Vcc (pin 1) of controller IC 101 via resistors R10 and R11. The line voltage at node 105 is also coupled to the primary winding 107 of power transformer T1-A. Capacitor C5 removes high frequency noise from the rectified line voltage input to the supply voltage pin Vcc (pin 1). The output of the front end section at node 105 is an unregulated DC input voltage.

The power stage is comprised of power transformer T1-A, bipolar junction transistor (BJT) power switch Q1, and controller IC 101. Power transformer T1-A includes a primary winding 107, a secondary winding 109, and an auxiliary winding 111. Controller IC 101 maintains output regulation via control of the ON and OFF states of BJT power switch Q1 via a control signal 115 output from the OUTPUT pin (pin 5) of controller IC 101. Control signal 115 drives the base (B) of BJT power switch Q1. The collector (C) of BJT power switch Q1 is connected to the primary winding 107, while the emitter (E) of BJT power switch Q1 is connected to the ISENSE pin (pin 4) of controller IC 101 and to ground via resistor R12. The ISENSE pin (pin 4) senses the current through the primary winding 107 and BJT switch Q1 in the form of a voltage across sense resistor R12. Controller IC 101 can employ any one of a number of modulation techniques, such as pulse-width-modulation (PWM) or pulse-frequency-modulation (PFM) and/or their combinations, to control the ON and OFF states and duty cycles of BJT switch Q1, as well as the amplitude of the base current of the BJT switch Q1. In one embodiment, the controller IC 101 determines and practices the configurable power factor control method for the switching power converter 100 as will be further described below. The GND pin (pin 2) of controller IC 101 is connected to ground.

The secondary stage is comprised of diode D6 functioning as an output rectifier and capacitor C10 functioning as an output filter. The resulting regulated output voltage Vout at node 113 is delivered to the load (not shown). Resistor R14 is the pre-load that is typically used for stabilizing the output in case of no load conditions of the flyback switching power converter 100. Also, ESD discharge gap (ESD1) is coupled between the primary winding 107 and the cathode of diode D6.

The output voltage Vout at node 113 is reflected across auxiliary winding 111, which is input to the VSENSE pin (pin 3) of controller 101 via a resistive voltage divider comprised of resistors R3 and R4. Capacitor C9 is used to hold power from the line voltage at node 105 at start-up or from the voltage across auxiliary winding 111 after start-up between switching cycles.

As mentioned previously, a single switch Q1 is used in single-stage power factor control circuits to regulate output power. However, the switch Q1 also affects both the input current and output current. If the bulk capacitor C2 in a single-stage power factor control circuit is small, input voltage distortion is minimized thus resulting in high power factor using a constant on-time control method of the switch Q1 with either fixed or variable switching frequency operation. During the constant on-time control method, the switch Q1 is turned on for the same length of time during operation of the power converter 100.

Figure 2:
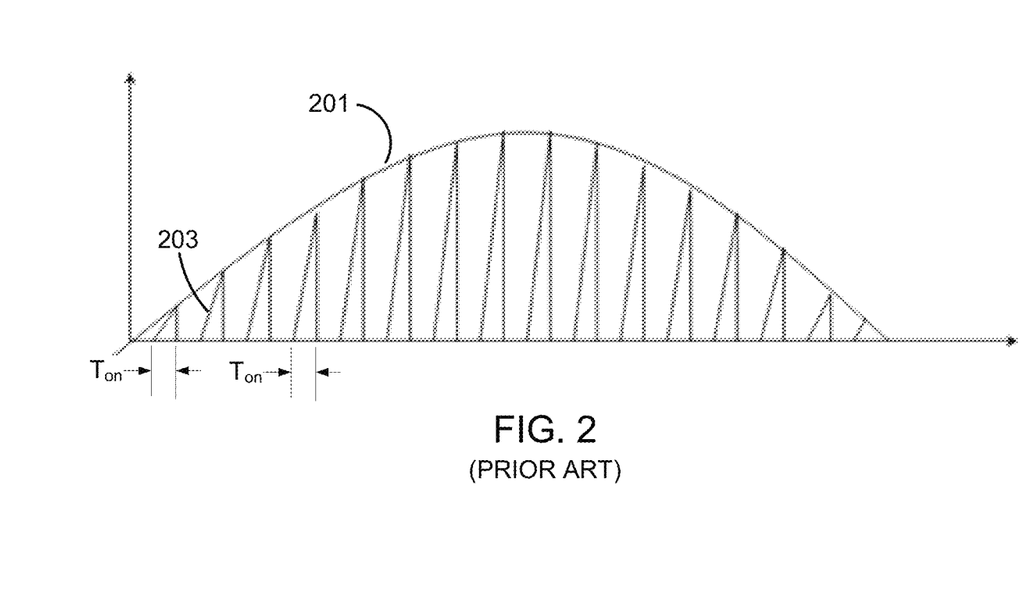
FIG. 2 illustrates input voltage and input current waveforms of a conventional switching power converter.

FIG. 2 illustrates a voltage waveform 201 of the voltage at the bulk capacitor C2 with respect to an input current waveform 203 of the input current in a conventional single-stage power factor control circuit using constant on-time control. As shown in FIG. 2, with the constant on-time control method, the average input current 203 follows the voltage 201 on the bulk capacitor C2. Thus, the input current to the power converter 100 follows the input voltage to the power converter 100 if there is little voltage distortion on the bulk capacitor C2. High power factor is therefore ensured using the single-stage approach with constant on-time control of the switch Q1. However, using the constant on-time control method results in a large output ripple at the output of the power converter 100 which requires a large output capacitor to filter the output ripple.

To obtain good output ripple performance, constant power delivery during an alternating current (AC) cycle in either a constant voltage mode or a constant current mode is used. The following equation is representative of the power (P) of a switching power converter 100 where $V_{in}$ is the input voltage at the bulk capacitor C2, $L_m$ is the primary winding inductance, $T_{on}$ is the on-time of the switch Q1, and $F_s$ is the switching frequency of the switching power converter 100:

$$P = \frac{(V_{in} \cdot T_{on})^2}{2 \cdot L_m} \cdot F_s$$

According to the above equation, in order to maintain constant power delivery to the load, the product of the input voltage to the switching power converter 100 and on-time of the switch Q1 must be constant. Therefore, when the input voltage increases, the on-time of the switch Q1 must decrease to maintain constant power delivery to the load. However, if constant power control is used, the input current to the switching power converter 100 will have high distortion (i.e., the input current diverts from being sinusoidal) due to the power balance requirement (i.e., constant power delivered to the load) of the single-stage power factor control approach thereby resulting in the inability achieve a high power factor.

For many low-power applications, power factor requirements are not necessarily very high. For example, a power factor of 0.7 or less is sufficient for a 10 watt consumer light emitting diode (LED) lighting. However, using a constant on-time control method could result in a power factor of 0.95, for example, which may be excessive for low-power applications. Thus, for low-power applications, a constant turn-on control method over the entire AC cycle is not necessary to meet the power factor requirements as well as to meet harmonic regulation requirements such as EN61000-3-2. Accordingly, the controller IC 101 combines the power regulation control methods of constant on-time control and constant power control (i.e., constant voltage mode and/or constant current mode) to adjust the power factor of the switching power converter 100 to balance the tradeoffs of the constant on-time mode and the constant power mode to meet power factor requirements for low power applications and for output ripple performance.

Figure 3:
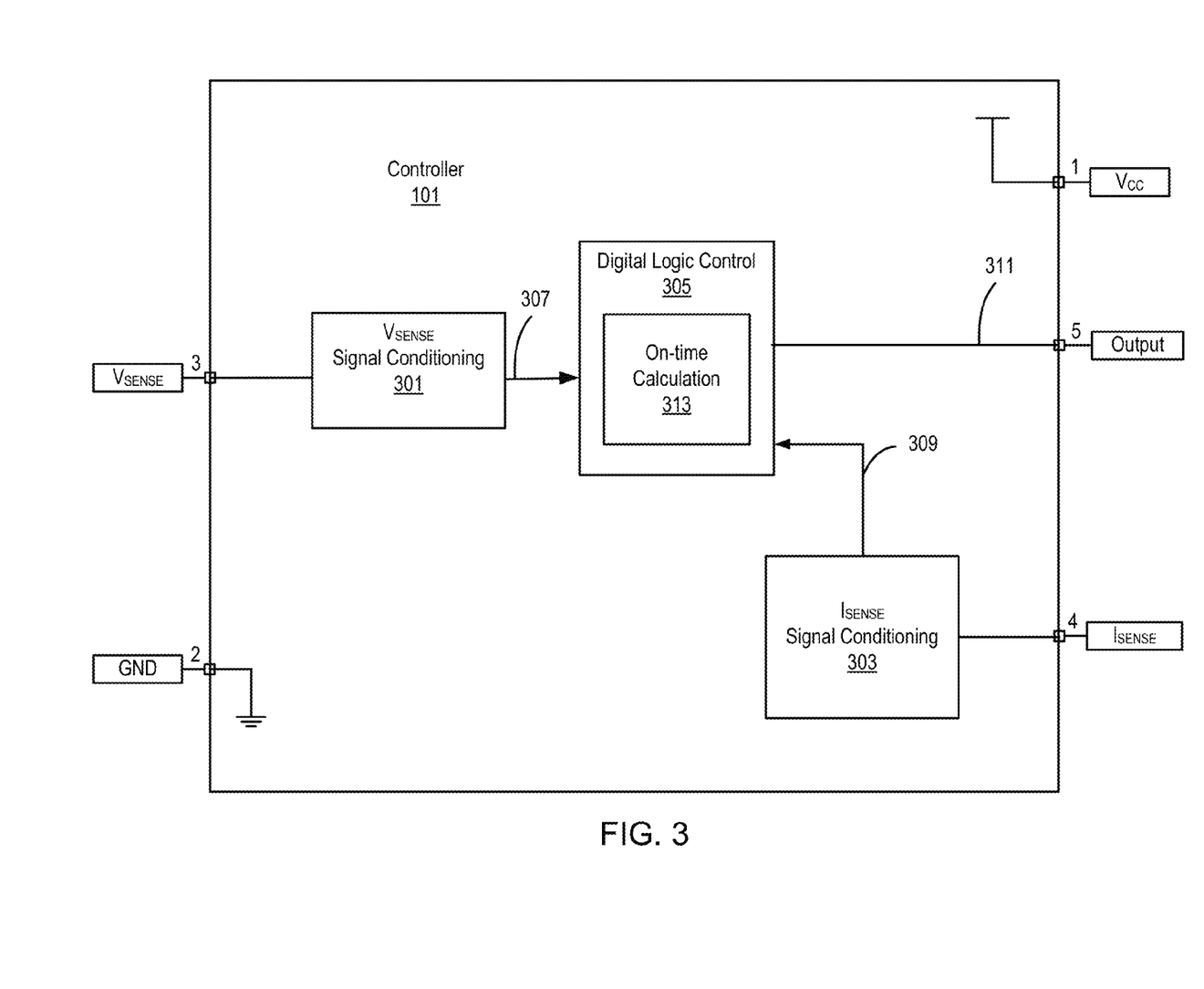
FIG. 3 illustrates the internal circuitry of the controller IC of the switching power converter according to one embodiment.

FIG. 3 illustrates the internal circuitry of the controller 101 according to one embodiment. Controller 101 receives analog parameters such as the Vsense voltage at pin 3 and the Isense voltage at pin 4, but adaptively processes these parameters using digital circuitry and digital state machines (not shown) to generate the appropriate base drive signal at pin 5 (Output). Controller 101 includes several main circuit blocks, including $V_{SENSE}$ signal conditioning block 301, an $I_{SENSE}$ signal conditioning block 303, and digital logic control block 305. Controller IC 101 regulates the output voltage Vout and output current Iout of the switching power supply 100 by means of adaptive digital, primary-side feedback control.

$V_{SENSE}$ signal conditioning block 301 receives $V_{SENSE}$ voltage as an analog voltage signal and generates one or more voltage feedback signals 307 that reflect the output voltage (Vo) at node 113. $I_{SENSE}$ signal conditioning block 303 receives the $I_{SENSE}$ voltage as an analog voltage signal and generates one or more current feedback signals 309 that reflect the primary side current flowing through switch Q1. Sensing the $V_{SENSE}$ voltage allows for precise output voltage regulation, and sensing the $I_{SENSE}$ voltage allows for precise cycle-by-cycle peak current control and limiting in both constant voltage and constant current modes as well as precise constant current (output current Iout) control that is insensitive to the magnetizing inductance Lm of the transformer T1-A.

Digital logic control block 305 processes the voltage feedback signals 307 and the current feedback signals 309 to generate the control signal 311 that governs the operation and on/off states of the switch Q1 for regulation of output voltage (Vo) and output current (Iout). Although not shown, digital logic control block 305 includes digital circuitry that determines the proper operation mode under which the switching power converter 100 should operate. This digital circuitry adaptively selects either pulse width modulation (PWM) or pulse frequency modulation (PFM) for control of switching frequency, and either constant power mode (i.e., constant voltage (CV) mode or constant current (CC) mode) or constant on-time mode for output regulation. For example, during the constant power mode which utilizes the CC mode, the load at the output of the power converter 100 may be a string of light emitting diodes (LEDs) where the voltage drop across the LEDs is a function of the constant current that is applied across the LEDs. Thus, the voltage drop across the LEDs is constant since constant current is supplied to the LEDs resulting in constant power being delivered to the load.

In one embodiment, during each AC cycle of the input voltage to the power converter 100 (i.e., a single AC cycle) the digital logic control block 305 determines whether to operate the power converter 100 in the constant power mode or the constant on-time mode based on the magnitude of the instantaneous input line voltage as frequently as at the switching frequency of the switching power converter 100. In other embodiments, the digital logic control block 305 may determine whether to operate the power converter 100 in the constant power mode or the constant on-time mode based on the magnitude of the instantaneous input line voltage at only certain switching cycles of the switching power converter 100. Note that the frequency of the input voltage is different than the switching frequency of the power converter 100. The frequency of the input voltage is 50 Hz or 60 Hz compared to the higher switching frequency of switch Q1 of the power converter 100 which is in the kHz range (e.g., 40 kHz-200 kHz).

Particularly, the digital logic control block 305 operates the power converter 100 in the constant on-time mode during the AC cycle of the input voltage if the instantaneous input line voltage is lower than a threshold voltage and switches the mode of operation to the constant power mode if the instantaneous line voltage is above the threshold voltage as frequently as at the switching frequency of the switching power converter 100. Alternatively, the digital logic control block 305 switches the mode of operation to the constant power mode from the constant on-time mode if the instantaneous line voltage is above the threshold voltage at only certain switching cycles of the switching power converter 100. Thus, the digital logic control block 305 monitors the instantaneous input line voltage to determine whether the instantaneous input line voltage is lower or higher than the threshold voltage and operates the power converter 100 in either the constant on-time mode or constant power mode at the next switching cycle within the AC cycle of the input voltage to the power converter 100 based on the magnitude of the instantaneous input line voltage.

Assuming that the input line voltage is sinusoidal, within a single AC cycle of the input voltage to the power converter 100, the digital logic control block 305 operates the switching power converter 100 in the constant on-time mode while the instantaneous line voltage is below the threshold voltage. Once the instantaneous input line voltage of the AC cycle exceeds the threshold voltage, the digital logic control block 305 switches the operation of the switching power converter 100 to the constant power mode. More specifically, at the next switching cycle of the power converter 100 after the instantaneous input line voltage of the AC cycle exceeds the threshold voltage, the digital logic control block 305 switches the operation of the power converter 100 from the constant-on-time mode to the constant power mode.

Because the input line voltage is sinusoidal, the input line voltage eventually decreases below the threshold voltage during the AC cycle of the input voltage to the power converter 100 and the digital logic control block 305 switches the operation of the switching power converter 100 back to the constant on-time mode. That is, at the next switching cycle of the power converter 100 after the instantaneous input line voltage of the AC cycle decreases below the threshold voltage, the digital logic control block 305 switches the operation of the power converter 100 from the constant power mode to the constant-on time mode.

In one embodiment, the threshold voltage is based on the percentage of time that the power converter 100 is configured to operate in the constant on-time mode within an AC cycle of the input voltage. For example, assuming a 110 volt line voltage in North America, if the power converter 100 is configured to operate in the constant on-time mode for 50 percent of an AC cycle of the input voltage, the threshold voltage is 77.8 volts (i.e., 110*sin(45°)).

During the constant on-time mode, the digital logic control block 305 outputs the control signal 311 to turn on the switch Q1 with a constant on-time during which switch Q1 is turned on. That is, during the constant on-time mode, the on-time of the switch Q1 is constant (i.e., remains the same) across the switching cycles of the power converter 100. During the constant power mode, the digital logic control block 305 outputs the control signal 311 to turn on the switch Q1 with an on-time that may vary switching cycle by switching cycle and is less than the constant on-time of the switch Q1 during the constant on-time mode according to one embodiment. During the constant power mode, the power converter 100 may output constant current and/or voltage depending on the control method employed to deliver constant power to the load. Thus, the digital logic control block 305 switches operation between the constant on-time mode and the constant power mode any number of times during the switching cycles of the power converter 100 within a single AC cycle based on the magnitude of the instantaneous input voltage with respect to the threshold voltage. By switching the operation of the power converter between the constant on-time mode and the constant power mode during the AC cycle of input voltage to the power converter 100, power factor requirements are met while providing good output ripple performance.

In one embodiment, the digital logic control block 305 determines the input line voltage using the voltage at the Isense pin of the controller 101. The voltage at the Isense pin functions as a proxy for the input line voltage Vin because the slope of increase of the primary current $I_p$ through switch Q1 (represented by the Isense voltage) is substantially proportional to the input line voltage, through the relationship Vin=Lm $(dI_p/dt)$, where Lm is the magnetizing inductance of the primary winding 107 of transformer T1-A. Particularly, controller 101 uses the Isense voltage as a proxy for the line voltage Vin in CV mode and can also use the Isense voltage (representing the primary current $I_p$) in CC mode to maintain a constant, regulated output current from the switching power converter 100 as described in U.S. Pat. No. 7,443,700 issued to Yan et al. on Oct. 28, 2008 and assigned to iWatt Inc., which is incorporated by reference herein in its entirety.

Figure 4:
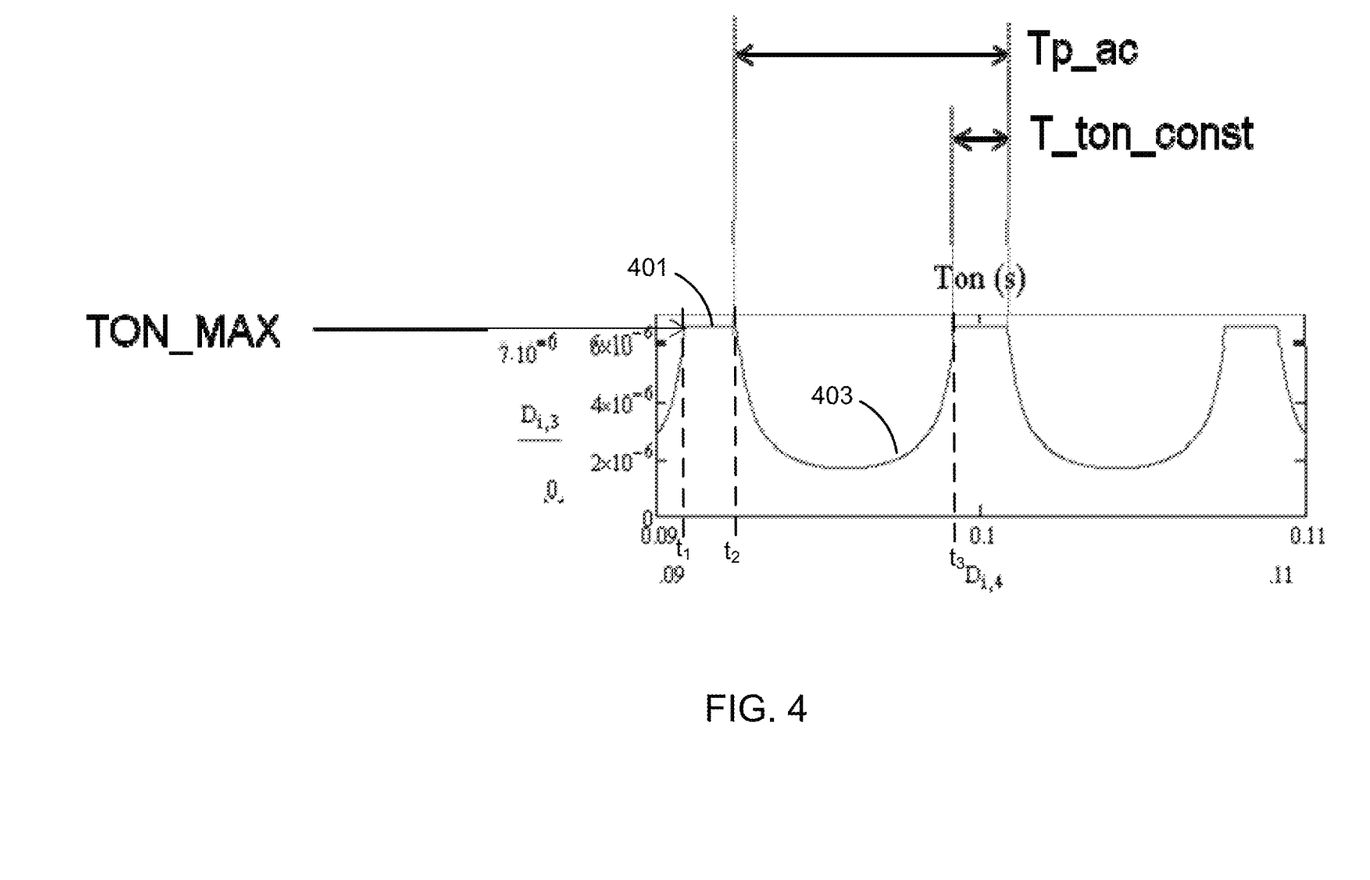
FIG. 4 illustrates an example waveform showing the on-time of a switch of the switching power converter.

FIG. 4 illustrates a waveform of the on-time (Ton) of the power converter 100 with respect to time using a combination of the constant power mode and the constant on-time mode. In FIG. 4, the operation of the power converter 100 in the constant on-time mode occurs during time $t_1$ to time $t_2$. Thus, $t_1$ to time $t_2$ corresponds to when the input line voltage of the power converter 100 is less than the threshold voltage. As shown in FIG. 4, the plateau 401 of the on-time waveform during time $t_1$ to time $t_2$ represents the utilization of the constant on-time during the constant on-time mode.

In FIG. 4, the operation of the power converter 100 in the constant power mode occurs during time $t_2$ to time $t_3$. Thus, time $t_2$ to $t_3$ corresponds to when the input line voltage of the power converter 100 is greater than the threshold voltage. As shown in FIG. 4, during time $t_2$ to $t_3$, the on-time of the power converter 100 may vary 403. The controller IC 101 varies (i.e., increases or decreases) the on-time of the switching power converter during time period $t_2$ to $t_3$ to output constant current and/or voltage depending on the control method employed to deliver constant power to the load. By operating the power converter 100 in both the constant on-time mode and the constant power mode within a cycle of the input voltage, the controller 101 provides enough power factor to at least meet power factor requirements for low power applications while at the same time providing good output ripple performance.

Generally, the power factor of the power converter 100 is based on the percentage of time that the on-time of the switch Q1 is constant within an AC cycle of the input voltage to the power converter 100. That is, the power factor of the power converter 100 is based on the percentage of time that the power converter 100 is operated in the constant on-time mode with respect to the constant power mode during an AC cycle of the input voltage to the power converter 100. In one embodiment, the percentage of time that the on-time of the switch Q1 is constant within an AC cycle is represented by the parameter PF_Index. Thus, the PF_Index represents the percentage of time that the power converter is operated in the constant on-time mode within an AC cycle of the input voltage to the power converter 100. For example, a PF_Index of 25% balances power factor and output ripple performance.

Generally, a higher PF_Index results in a higher power factor and lower input harmonic distortion. However, the higher PF_Index sacrifices output ripple performance. A higher PF_Index indicates that the power converter 100 is operated for a longer percentage of time in the constant on-time mode during the AC cycle compared to the percentage of time that the power converter 100 is operated in the constant power mode. In contrast, a lower PF_Index increases output ripple performance by minimizing the output ripple. However, the lower PF_Index produces lower power factor and higher input harmonic distortion. A lower PF_Index indicates that the power converter 100 is operated for a shorter percentage of time in the constant on-time mode during the AC cycle compared to the percentage of time that the power converter 100 is operated in the constant power mode. Configuring the PF_Index allows for design flexibility to address the trade-off between input power factor, input harmonic distortion, and output ripple performance. In one embodiment, the PF_Index is based on the following parameters shown in FIG. 4:

TON_MAX which represents the maximum on-time of the switch Q1;

T_on_const which represents the time duration during which the on-time of the switch Q1 is constant at TON_MAX; and Tp_ac which represents half the AC period of the input line voltage.

In one embodiment, the relationship of the above parameters is described by the following equation:

$$\text{PF\_Index} = \frac{\text{T\_on\_const}}{\text{TP\_ac}}$$

As shown above, the PF_Index is based on the ratio of the time duration (i.e., T_on_const) during which the on-time of the switch Q1 is constant at TON_MAX and the half the AC period (i.e., Tp_ac).

Figure 5:
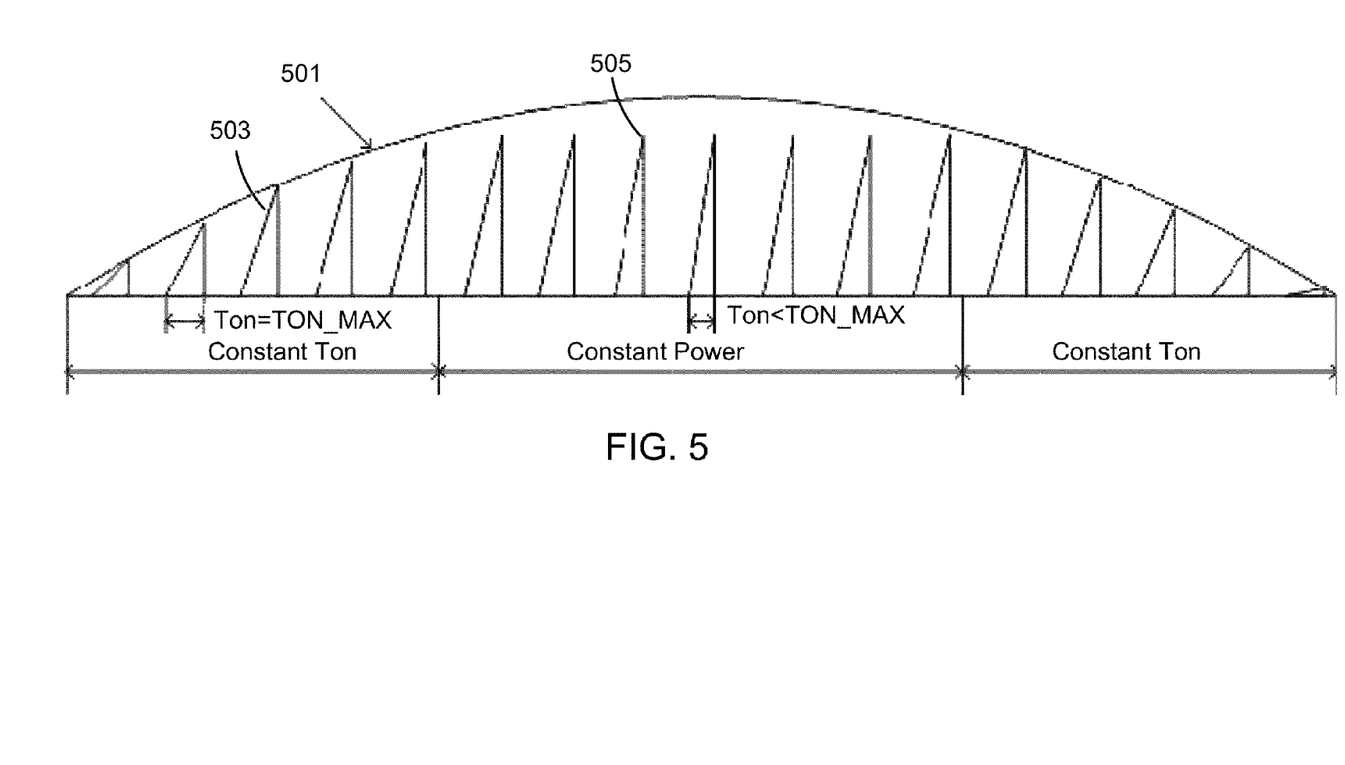
FIG. 5 illustrates an example input voltage and input current waveforms of the switching power converter.

FIG. 5 illustrates one example of a voltage waveform 501 of the voltage at the bulk capacitor C2 with respect to an input current waveform 503 of the input current of the power converter 100 using both the power regulation control methods of constant on-time control and constant power control. Note that in the example shown in FIG. 5, constant current mode is used during the constant power control.

As shown in FIG. 5, during the constant on-time (Ton) operation within the AC cycle of the input voltage to the power converter 100, the digital logic control 305 clamps the on-time (Ton) of the switch Q1 at TON_MAX. Thus, the on-time of the switch Q1 is constant during the constant on-time control. Furthermore, as shown in FIG. 5, the input current waveform 503 follows the voltage waveform 501 during the constant on-time control. In contrast, during the constant power control operation during the cycle of the input voltage, the on-time may vary and is less than TON_MAX to maintain constant power delivery to the load. Also, as shown in FIG. 5, the input current waveform 503 does not follow the voltage waveform 501 during the constant power mode control. For example, the peak 505 of the input current maintains constant during the constant power mode due to the use of constant current control while in the constant power mode.

Referring back to FIG. 3, in one embodiment the digital logic control 305 comprises an on-time calculation block 313. The on-time calculation block 313 determines the TON_MAX value that will result in the configured PF_INDEX that meets the desired power factor. In one embodiment, the on-time calculation block 313 may select an initial TON_MAX (e.g., 4 microseconds) as a baseline on-time. The on-time calculation block 313 evaluates the resulting PF_INDEX from using the initial TON_MAX to determine the TON_MAX that results in the configured PF_INDEX. That is, the on-time calculation block 313 adjusts the initial TON_MAX until the configured PF_INDEX is reached.

Figure 6:
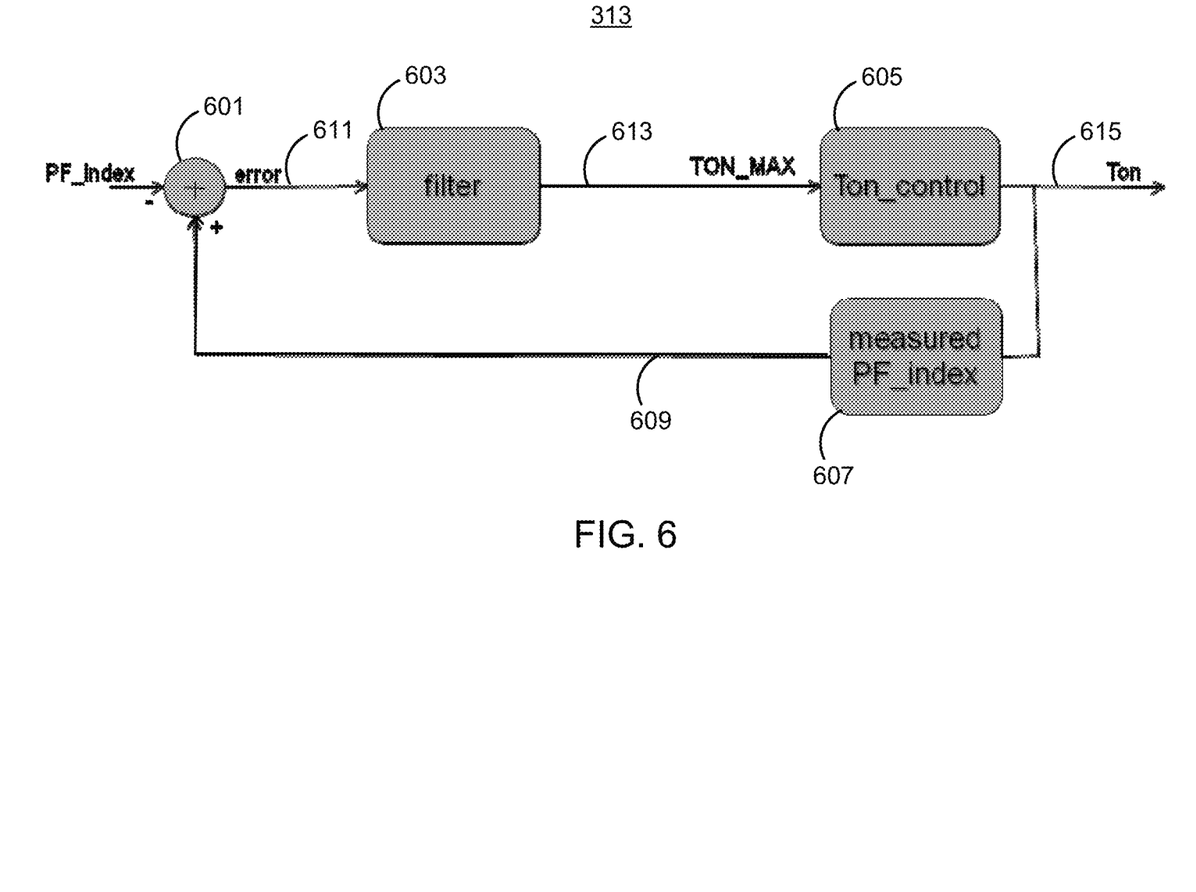
FIG. 6 illustrates a circuit diagram of the digital logic control of the controller IC according to one embodiment.

In one embodiment, the on-time calculation block 313 comprises a closed loop system shown in FIG. 6 that is used to identify the TON_MAX that results in the configured PF_INDEX. The closed loop system comprises an adder 601, a filter 603, a Ton_control block 605, and a measured PF_index block 607. In one embodiment, the measured PF_index block 607 measures the PF_INDEX resulting from the initial TON_MAX set by the on-time calculation block 313. The measured PF_index block 607 outputs the measured PF_INDEX 609 to the adder 601. The adder 601 subtracts the measured PF_INDEX from the configured PF_INDEX. The error (i.e., difference) 611 between the configured PF_INDEX and the measured PF_INDEX is outputted to a filter 603. In one embodiment, the filter 603 is a low-pass filter that removes high frequency noise from the received error 611. The filter 603 outputs the filtered error 613 to the Ton_control block 605.

In one embodiment, if the filtered error 613 is a negative value indicating that the measured PF_INDEX is larger than the configured PF_INDEX, the Ton_control block 605 increases TON_MAX and outputs the increased value of TON_MAX as the on-time (Ton) 615 of the switch Q1. In one embodiment, the Ton_control block 605 increases TON_MAX by a percentage of TON_MAX until a value of TON_MAX is achieved that results in the measured PF_INDEX being approximately the same as the configured PF_INDEX. As a result, the percentage of time that the power converter 100 operates in the constant on-time mode at TON_MAX decreases. If the filtered error 613 is a positive value indicating that the measured PF_INDEX is less than the configured PF_INDEX, the Ton_control block 605 decreases TON_MAX and outputs the decreased value of TON_MAX as the on-time (Ton) 615 of the switch Q1. In one embodiment, the Ton_control block 605 decreases TON_MAX by a percentage of TON_MAX until a value of TON_MAX is achieved that results in the measured PF_INDEX being approximately the same as the configured PF_INDEX. As a result, the percentage of time that the power converter 100 operates in the constant on-time mode decreases.

The value of the adjusted TON_MAX outputted by the Ton_control block 605 is also transmitted to the measured PF_index block 607. The measured PF_index block 607 again measures the PF_INDEX based on the value of the adjusted TON_MAX received from the Ton_control block 605 which is compared to the configured PF_index by the adder 601. Thus, the on-time calculation block 313 repeats the adjustment of TON_MAX until the measured PF_INDEX is equivalent to the configured PF_INDEX. Alternatively, the on-time calculation block 313 repeats the adjustment of TON_MAX until the measured PF_INDEX is within a threshold value or a threshold percentage of the configured PF_INDEX.

Figure 7:
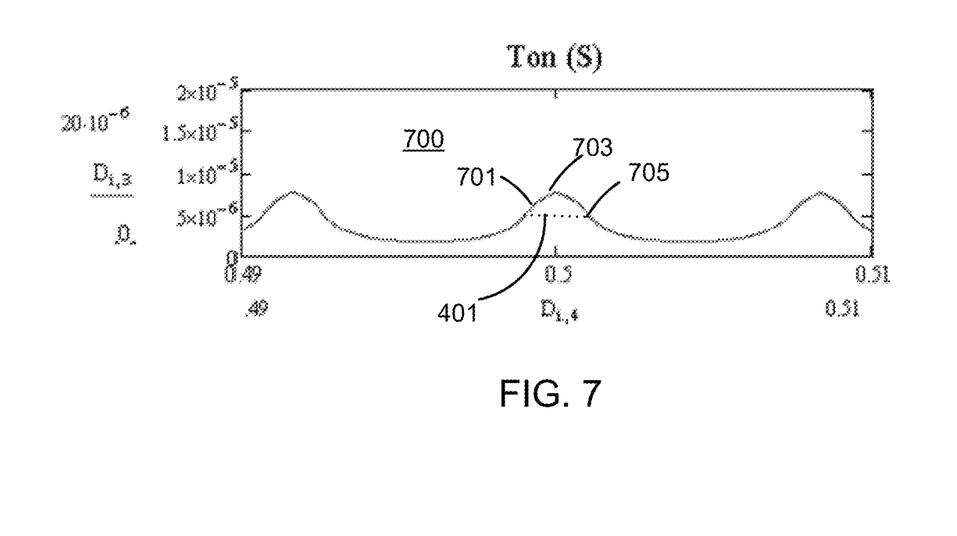
FIG. 7 illustrates an example waveform showing the on-time of a switch of the switching power converter using on-time shaping.

In another embodiment, the on-time calculation block 313 may modify TON_MAX to further optimize power factor and output ripple. That is, the on-time calculation block 313 may shape the on-time of the switch Q1 so that the on-time is not constant even during the constant on-time mode. FIG. 7 illustrates one example of a waveform 700 of the on-time (Ton) of the power converter 100 with respect to time using shaping of TON_MAX. Plateau 401 represents the constant on-time of the switch Q1 of FIG. 4 compared with the shaped on-time 700 shown in FIG. 7. In one embodiment, the on-time waveform 700 illustrates that the on-time of the switch Q1 increases 701 until a peak 703 (i.e., TON_MAX_SHAPED) is reached before the on-time begins decreasing. Thus, the shaped on-time exceeds the value of the on-time represented by plateau 401.

In one embodiment, the on-time calculation block 313 calculates TON_MAX_SHAPED based on the instantaneous input AC voltage Vin to the power converter 100 during the constant on-time of the switch Q1 at TON_MAX represented by plateau 401 and the sensed voltage Vin_hit. In one embodiment, Vin_hit is the sensed input AC voltage during the transition 705 from constant-on time control to constant power control during an AC cycle of the input voltage. In one embodiment, the on-time calculation block 313 calculates TON_MAX_SHAPED according to the following equation:

$$\text{TON\_MAX\_SHAPED} = \frac{(2 \cdot \text{Vin\_hit} - \text{Vin}) \cdot \text{TON\_MAX}}{\text{Vin\_hit}}$$

As shown above, when Vin approaches zero, TON_MAX_SHAPED is clamped at a maximum of two times the value of TON_MAX. However, note that in other embodiments TON_MAX_SHAPED may be clamped at other values. By shaping TON_MAX, output ripple performance is improved compared to when constant TON_MAX is employed. For example, using a constant TON_MAX may result in 0.7 power factor and 35% output ripple. In contrast, shaping TON_MAX may result in 0.7 power factor but only a 30% output ripple. The smoother transition between the constant on-time mode and constant power mode also reduces harmonic content in the input current.

Upon reading this disclosure, those of skill in the art will appreciate still additional alternative designs for switching power converters. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A switching power converter comprising:
   a transformer including a primary winding coupled to an input voltage and a secondary winding coupled to an output of the switching power converter;
   a switch coupled to the primary winding of the transformer, current through the primary winding being generated while the switch is turned on and not being generated while the switch is turned off; and
   a controller configured to generate a control signal to turn on or turn off the switch at each of a plurality of switching cycles of the switch;
   wherein the controller is further configured to generate the control signal to turn on the switch in a constant on-time mode of the switching power converter during each of the plurality of switching cycles for a first duration that is constant during each of the plurality of switching cycles corresponding to a first part of at least a single one of AC cycles of the input voltage responsive to the input voltage being less than a threshold voltage; and
   wherein the controller is further configured to generate the control signal to turn on the switch in a constant power mode of the switching power converter during each of the plurality of switching cycles for a second duration that varies during at least some of the plurality of switching cycles corresponding to a second part of said at least the single one of the AC cycles of the input voltage responsive to the input voltage being greater than the threshold voltage;
   wherein the controller does not receive a level of the input voltage and is further configured to determine whether the input voltage is less than or greater than the threshold voltage based on a slope of the current through the primary winding that is used by the controller as a proxy for the level of the input voltage.

2. The switching power converter of claim 1, wherein the controller is further configured to determine whether the input voltage is less than the threshold voltage or greater than the threshold voltage during at least some of the plurality of switching cycles of the switch of said at least the single one of the AC cycles.

3. The switching power converter of claim 1, wherein the second duration is less than the first duration.

4. The switching power converter of claim 1, wherein the controller is further configured to determine the first duration based on a percentage of time that the switch is turned on for the first duration within said at least the single one of the AC cycles of the input voltage to the switching power converter.

5. The switching power converter of claim 4, wherein the percentage of time that that the switch is turned on for the first duration within said at least the single one of the AC cycles of the input voltage to the switching power converter is indicative of a power factor of the switching power converter.

6. The switching power converter of claim 4, wherein the controller is configured to determine the first duration by:
determining a configured percentage of time that the switch is turned on for the first duration corresponding to the first part of said at least the single of the AC cycles of the input voltage to the switching power converter;
setting an initial duration of time that the switch is to be turned on during the constant on-time mode;
calculating the percentage of time that the switch is turned on for the initial duration of time within said at least the single of the AC cycles of the input voltage to the switching power converter; and
adjusting the initial duration of time until the configured percentage of time that the switch is turned on within said at least the single of the AC cycles of the input voltage to the switching power converter is reached.

7. The switching power converter of claim 1, wherein the controller is further configured to determine a third duration of time in which the switch is turned on during the constant on-time mode based on the output voltage during the constant on-time mode, wherein the third duration is greater than the first duration.

8. The switching power converter of claim 1, wherein the controller is configured to generate the control signal to turn on the switch in the constant power mode at a next switching cycle of said at least the single one of the AC cycles of the input voltage responsive to the input voltage being greater than the threshold voltage.

9. In a controller, a method of controlling a switching power converter, the switching power converter including a transformer coupled between an input voltage and an output of the switching power converter, the transformer including a primary winding coupled to the input voltage and a secondary winding coupled to the output of the switching power converter, and a switch coupled to the primary winding of the transformer, current through the primary winding being generated while the switch is turned on and not being generated while the switch is turned off, the method comprising:
generating a control signal to turn on or turn off the switch at each of a plurality of switching cycles of the switch;
wherein the control signal is generated to turn on the switch in a constant on-time mode of the switching power converter during each of the plurality of switching cycles for a first duration that is constant during each of the plurality of switching cycles corresponding to a first part of at least a single one of AC cycles of the input voltage responsive to the input voltage being less than a threshold voltage; and
wherein the control signal is generated to turn on the switch in a constant power mode of the switching power converter during each of the plurality of switching cycles for a second duration that varies during at least some of the plurality of switching cycles corresponding to a second part of said at least the single one of the AC cycles of the input voltage responsive to the input voltage being greater than the threshold voltage;
wherein the control signal is generated to turn on the switch in either the constant on-time mode or the constant power mode using a slope of the current through the primary winding and without the controller receiving a level of the input voltage, the slope of the current being a proxy for the level of the input voltage.

10. The method of claim 9, further comprising:
determining whether the input voltage is less than the threshold voltage or greater than the threshold voltage during at least some of the plurality of switching cycles of the switch of said at least the single one of the AC cycles.

11. The method of claim 9, wherein the second duration is less than the first duration.

12. The method of claim 9, further comprising:
determining the first duration based on a percentage of time that the switch is turned on for the first duration within said at least the single one of the AC cycles of the input voltage to the switching power converter.

13. The method of claim 12, wherein the percentage of time that that the switch is turned on for the first duration within said at least the single one of the AC cycles of the input voltage to the switching power converter is indicative of a power factor of the switching power converter.

14. The method of claim 12, wherein determining the first duration comprises:
determining a configured percentage of time that the switch is turned on for the first duration corresponding to the first part of said at least the single of the AC cycles of the input voltage to the switching power converter;
setting an initial duration of time that the switch is turned on during the constant on-time mode;
calculating the percentage of time that the switch is to be turned on for the initial duration of time within said at least the single of the AC cycles of the input voltage to the switching power converter; and
adjusting the initial duration of time until the configured percentage of time that the switch is turned on within said at least the single of the AC cycles of the input voltage to the switching power converter is reached.

15. The method of claim 9, further comprising:
determining a third duration of time in which the switch is turned on during the constant on-time mode based on the output voltage during the constant on-time mode, wherein the third duration is greater than the first duration.

16. The method of claim 9, further comprising:
generating the control signal to turn on the switch in the constant power mode at a next switching cycle of said at least the single one of the AC cycles of the input voltage responsive to the input voltage being greater than the threshold voltage.

* * * * *